United States Patent [19]

Kaji

[11] Patent Number: 5,617,167
[45] Date of Patent: Apr. 1, 1997

[54] LENS COVER DRIVE MECHANISM FOR A CAMERA

[75] Inventor: Hidenobu Kaji, Kawasaki, Japan

[73] Assignee: Nikon Corporation, Tokyo, Japan

[21] Appl. No.: 511,862

[22] Filed: Aug. 7, 1995

[30] Foreign Application Priority Data

Aug. 31, 1994 [JP] Japan .................................. 6-207143

[51] Int. Cl.⁶ .................................................. G03B 17/00
[52] U.S. Cl. ......................................................... 396/448
[58] Field of Search ........................... 354/187, 202, 354/288, 154

[56] References Cited

U.S. PATENT DOCUMENTS 5,461,441  10/1995  Kotani ..................................... 354/187

Primary Examiner—David M. Gray

[57] ABSTRACT

A lens cover mechanism which drives a lens cover to cover a from surface of a lens barrel of a camera, wherein the lens cover drive mechanism has a drive source to generate a drive force. The lens cover drive mechanism also includes a transmission member to receive the drive force from the drive source, an urging member to receive the drive force from the transmission member and to urge a buffer member in the direction of the drive force. In a situation where an external force is applied to the lens cover to prevent movement, the buffer member resiliently deforms when the drive force is received from the urging member, thereby preventing the drive force from being transferred to the lens cover. As a result, the lens cover and the lens cover drive mechanism do not get damaged. The axis of rotation of the lens cover, the urging member and the buffer member are all arranged on a single shaft.

19 Claims, 5 Drawing Sheets

LENS COVER DRIVE MECHANISM FOR A CAMERA

BACKGROUND OF THE INVENTION

1. Field of the Invention

The present invention relates to a lens cover drive mechanism and, more particularly, to a lens cover drive mechanism for driving a lens cover of a camera.

2. Description of the Related Art

Cameras are known having a lens cover which is directly coupled to a lens cover drive mechanism, such that the lens cover drive mechanism opens and closes the lens cover. This type of conventional camera has an electric motor, a gear train, and a lens cover to cover an end of a lens barrel. The electric motor causes generation of a drive force, and the gear train transmits the drive force of the electric motor to the lens cover. The lens cover is integrally fixed to one of the gears of the gear train and integrally moves in a rotary motion accompanying the movement of the connected gear. Namely, the lens cover opens and closes at the front surface portion of the lens barrel by accompanying the rotary motion of the connected gear.

In the above-mentioned conventional camera, when an external force presses the lens cover, it is possible for breakage of a portion of the gear train or of the lens cover to occur. This is due to the fact that the lens cover and one of the gears which drive the lens cover are integrally fixed to each other. In a case that the lens cover becomes caught for some reason, the drive force to drive the lens cover places a strain on some portions of the lens cover drive mechanism and the lens cover, creating a risk of deformation or breakage of the portion on which the drive force has acted.

FIG. 7 shows another type of conventional camera having a lens cover and a lens cover drive mechanism. The shaft 1 has a protuberance 1a which receives a drive force and rotates in the direction of arrow (a). The shaft 1 is fixed to an extension 2a of a member 2. The member 2 has a shaft portion 2b which is arranged in parallel to the shaft 1 and fits through a hole 3a of a transmission arm 3. The shaft portion 2b is slidable in the hole 3a. A coil spring 4 is fitted on the shaft 1 and urges the shaft portion 2b towards one side surface of the hole 3a. Through the coil spring 4, the contact state of the shaft portion 2b and the hole 3a is maintained. When the member 2 rotates, the shaft portion 2b does not slide in the hole 3a due to the urging force of the coil spring 4. Consequently, when the shaft portion 2b rotates, the transmission arm 3 is driven in the direction of arrow (b). The transmission arm 3 has a protuberance 3b at an opposite end from the hole 3a, and the protuberance 3b and a fulcrum 5a of a barrier (lens cover) 5 cooperate with each other. The barrier 5 is rotatable about the fulcrum 5a. When the transmission arm 3 is driven in the direction of the arrow (b), the barrier 5 rotates about the fulcrum 5a, and the barrier 5 is opened and closed.

When the barrier 5 is fixed in place by an external force, the transmission arm 3 does not move in the direction of arrow (b). In the fixed state of the barrier 5, when a drive force acts on protuberance 1a, the coil spring 4 cannot maintain the shaft portion 2b in the same contact position in the hole 3a. The barrier 5 remains in place without the drive force being applied thereto. Thus, it becomes possible to allow the lens cover drive force to dissipate without damaging either the barrier (lens cover) or the lens cover drive mechanism.

SUMMARY OF THE INVENTION

The present invention takes the above-noted problems into account, and has as one of its objects to provide a camera having a lens cover which will not break or be determined, even in the case that an external force prohibits intended motion of the lens cover.

It is another object of the present invention to provide a camera having a lens cover which will not break or be deformed when the lens cover is prevented from moving in which the camera body is compact.

Additional objects and advantages of the invention will be set forth in part in the description which follows and, in part, will be obvious from the description, or may be learned by practice of the invention.

The foregoing objects of the present invention are achieved by providing a lens cover drive mechanism to drive a lens cover which covers the surface of a lens, wherein the lens cover drive mechanism includes a drive source to generate a drive force, a transmission member to receive the drive force from the drive source, an urging member to receive the drive force from the transmission member and to urge a buffer member in the direction of action of the drive force. The buffer member acts by means of the drive force and a force which is reciprocal to the drive force acting upon the lens cover.

The buffer member has one end which is connected to the urging member and receives a rotary force which causes the buffer member to rotate, and another end to which is applied an external force in the direction opposite to the rotary force, such that the buffer member is twisted by the rotary force and the external force. The buffer member is a resilient member as is the urging member.

The drive source is an electric motor and the transmission member is formed with gears. The lens cover rotates with one point as a fulcrum, and the fulcrum, the urging member and the buffer member are situated on the same axis.

In the case that an external force, applied to the lens cover of the camera having a lens cover drive mechanism according to the embodiment of the present invention, prevents the lens cover from moving, the drive force is absorbed by the buffer member. Therefore, the risk of deformation or breakage of the lens cover or the transmission member is mitigated.

The urging member, buffer member and axis of rotation of the lens cover are all situated on a single shaft, thereby reducing the required size of the camera body and making the camera more compact.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
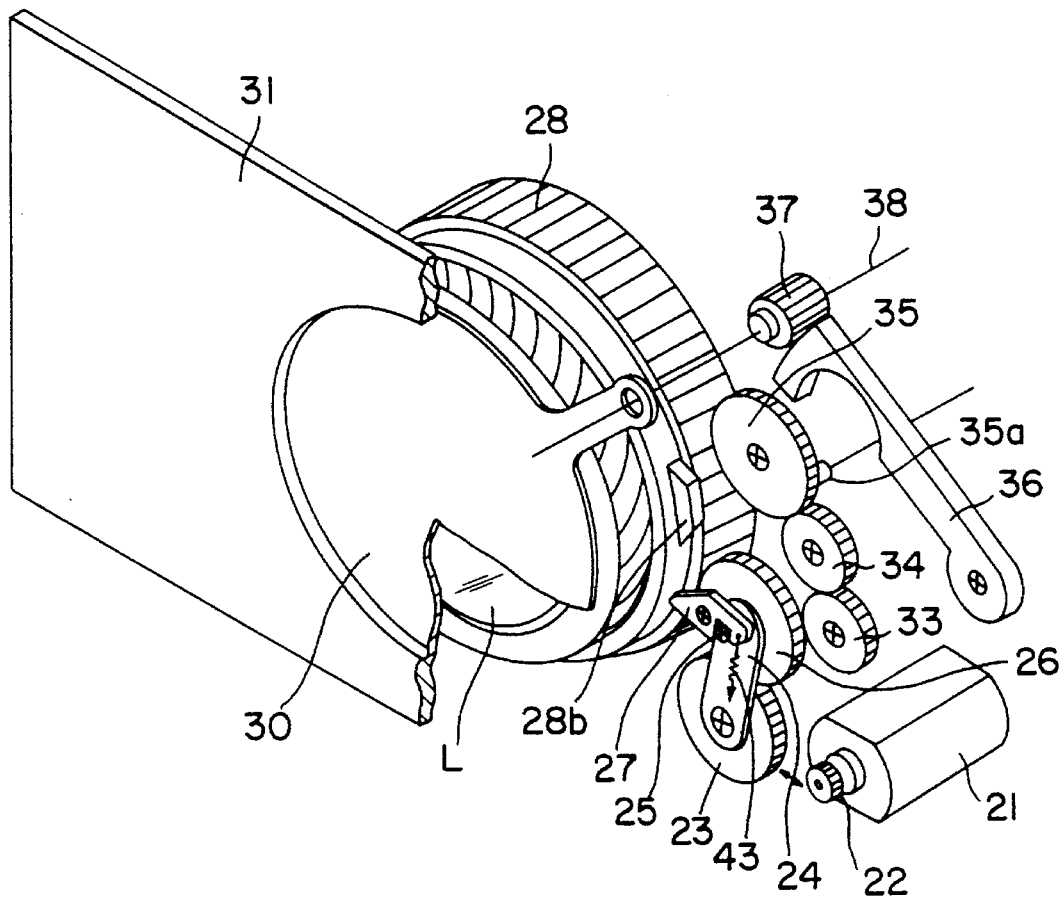
FIG. 1 is a schematic oblique diagram showing a lens cover drive mechanism, having a drive unit to drive a lens barrel and a lens cover, according to an embodiment of the present invention.

Reference will now be made in detail to the present preferred embodiments of the present invention, examples of which are illustrated in the accompanying drawings, wherein like reference numerals refer to like elements throughout.

Figure 2:
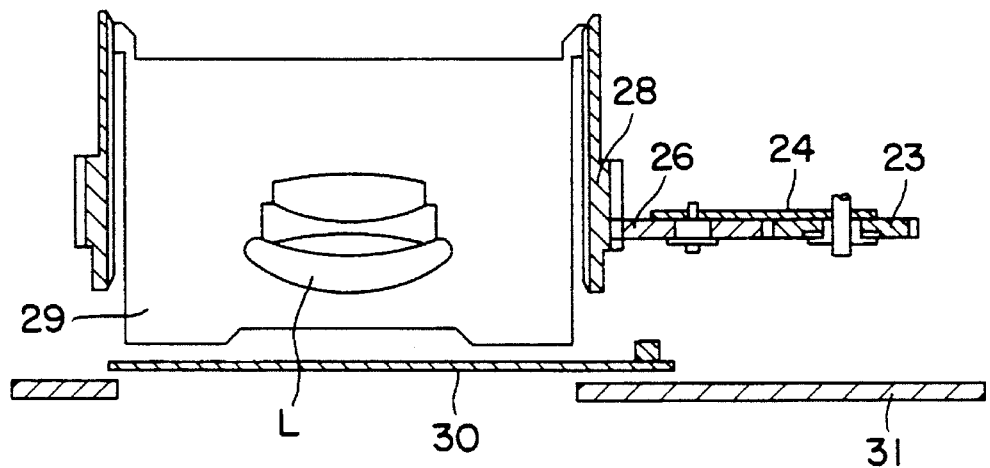
FIG. 2 is a transverse sectional side surface view of the lens cover drive mechanism shown in FIG. 1.
Figure 3:
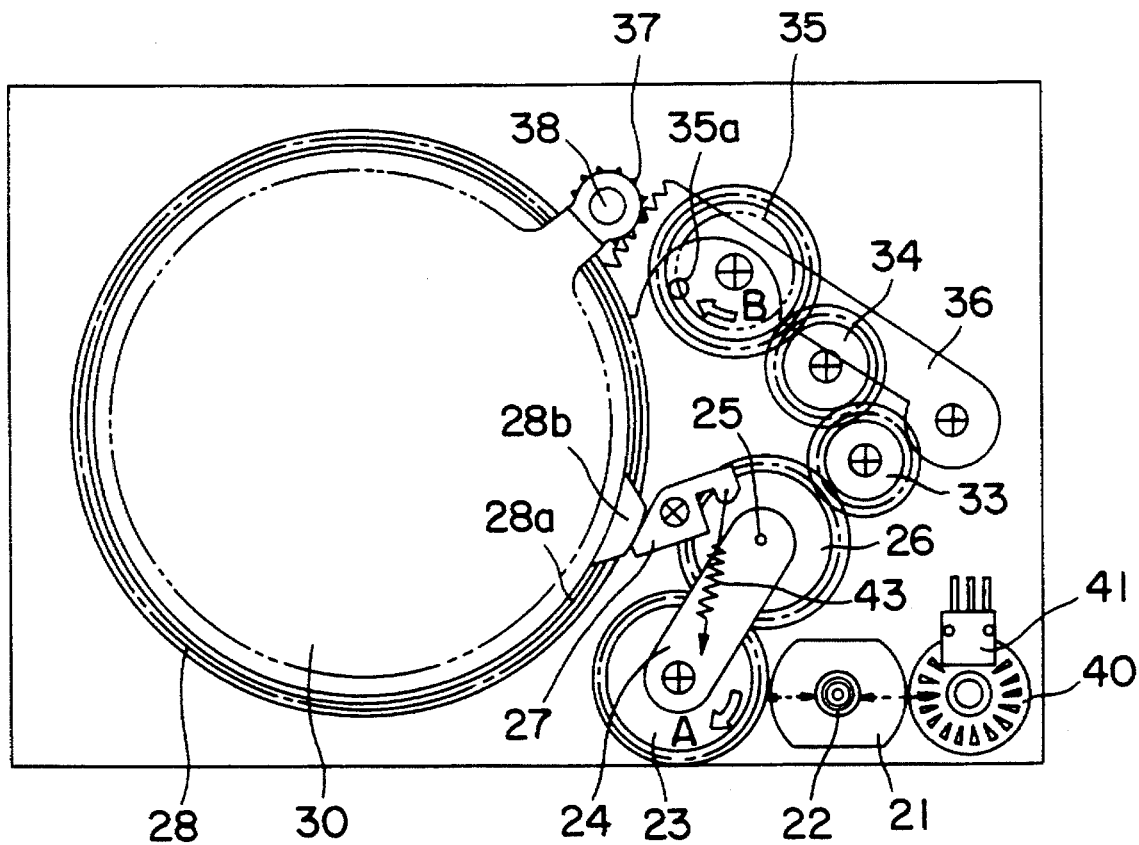
FIG. 3 is a schematic diagram showing the lens cover drive mechanism shown in FIG. 1 as viewed from a camera front side surface.
Figure 4:
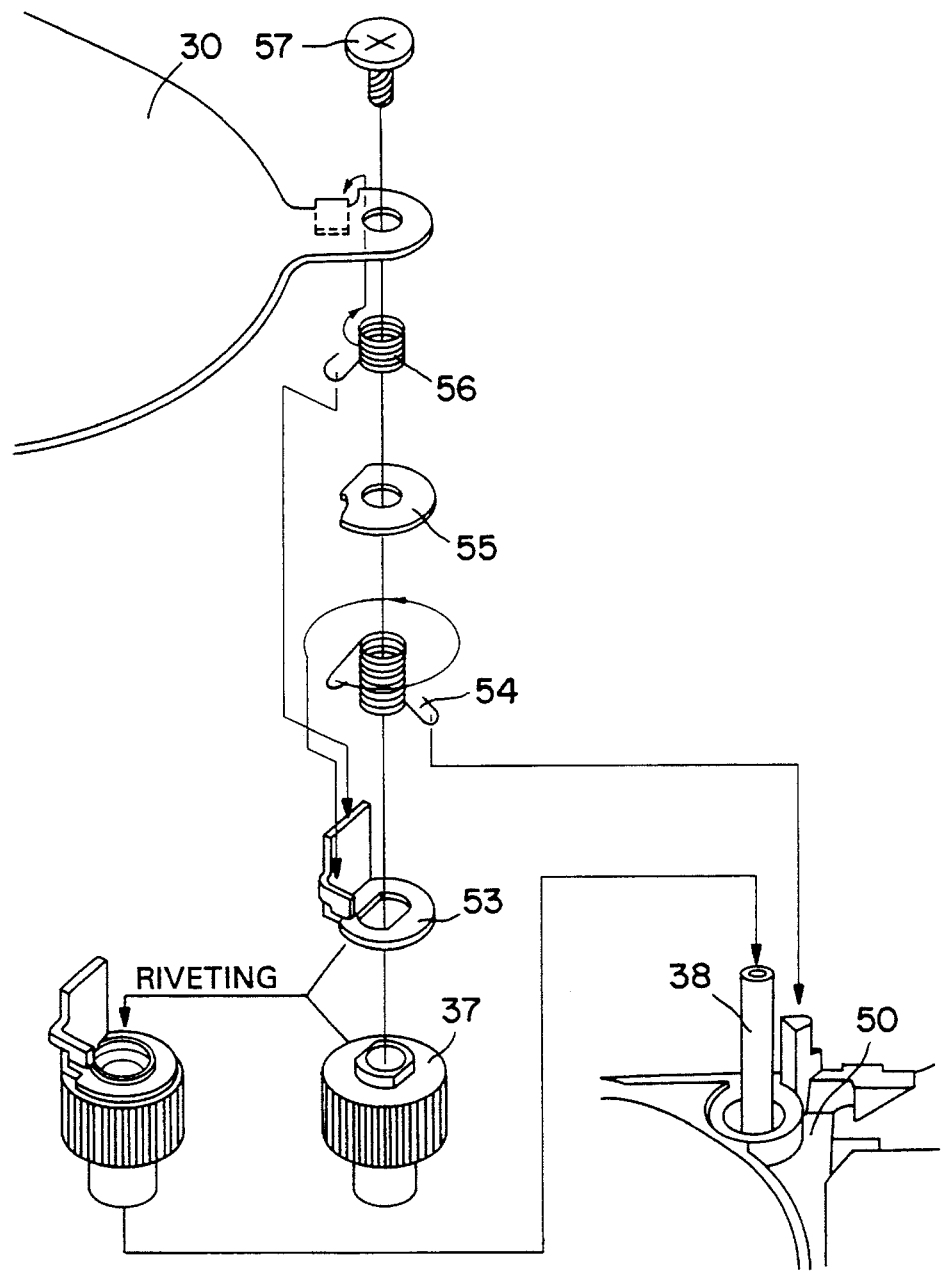
FIG. 4 is an exploded view of a portion of the lens operation of the lens cover, revealing a sequence of assembly, according to an embodiment of the present invention.
Figure 5A:
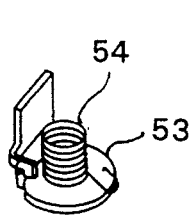
FIGS. 5A through 5C are close-up assembled views of various portions of the lens cover drive mechanism shown in FIG. 4.
Figure 5B:
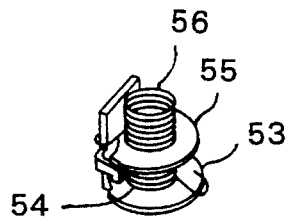
Figure 5C:
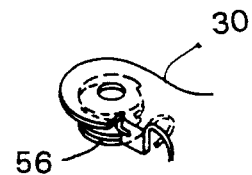
Figure 6:
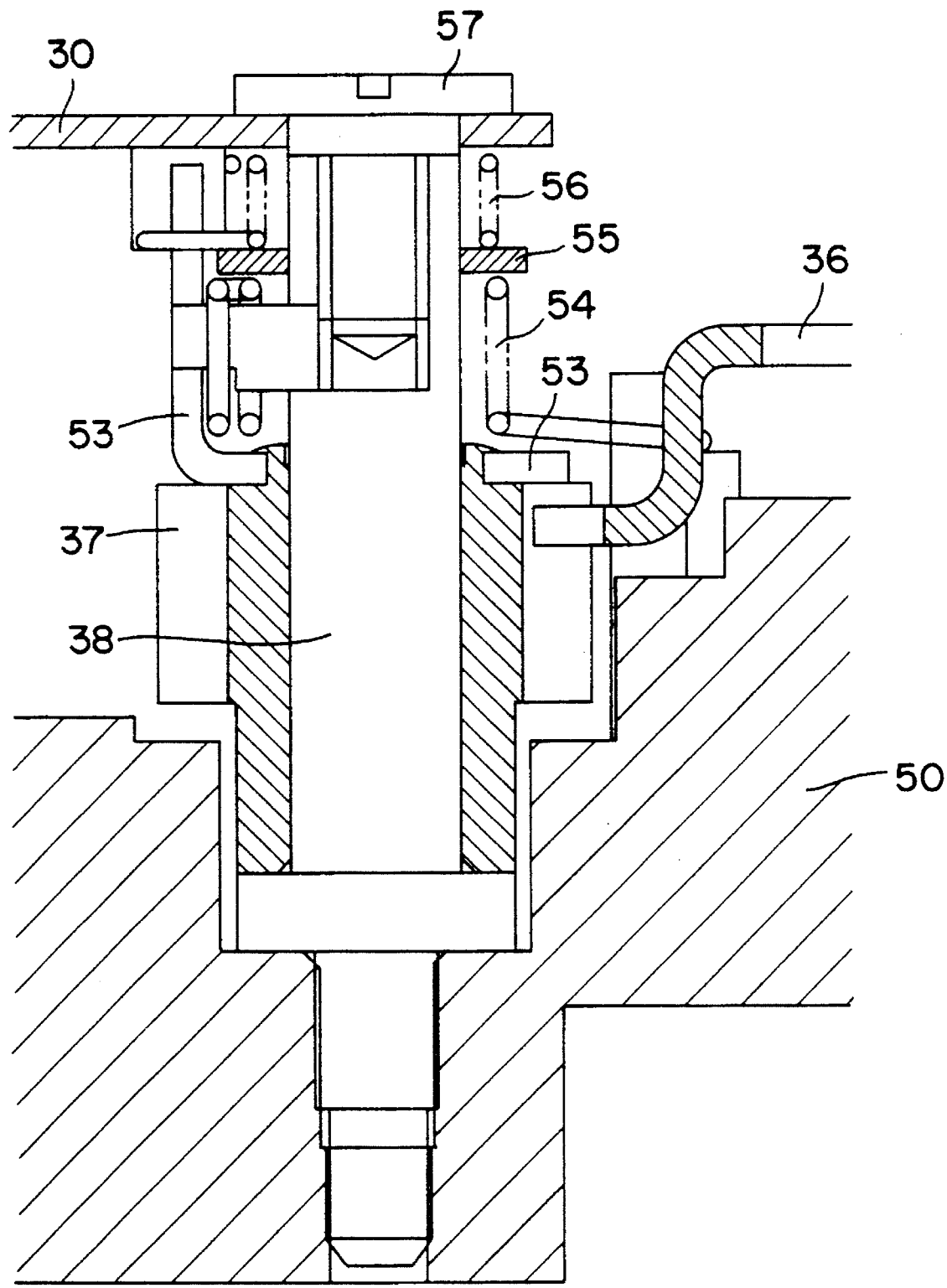
FIG. 6 is a cross sectional view of an assembled state of the parts shown FIG. 4.
Figure 7:
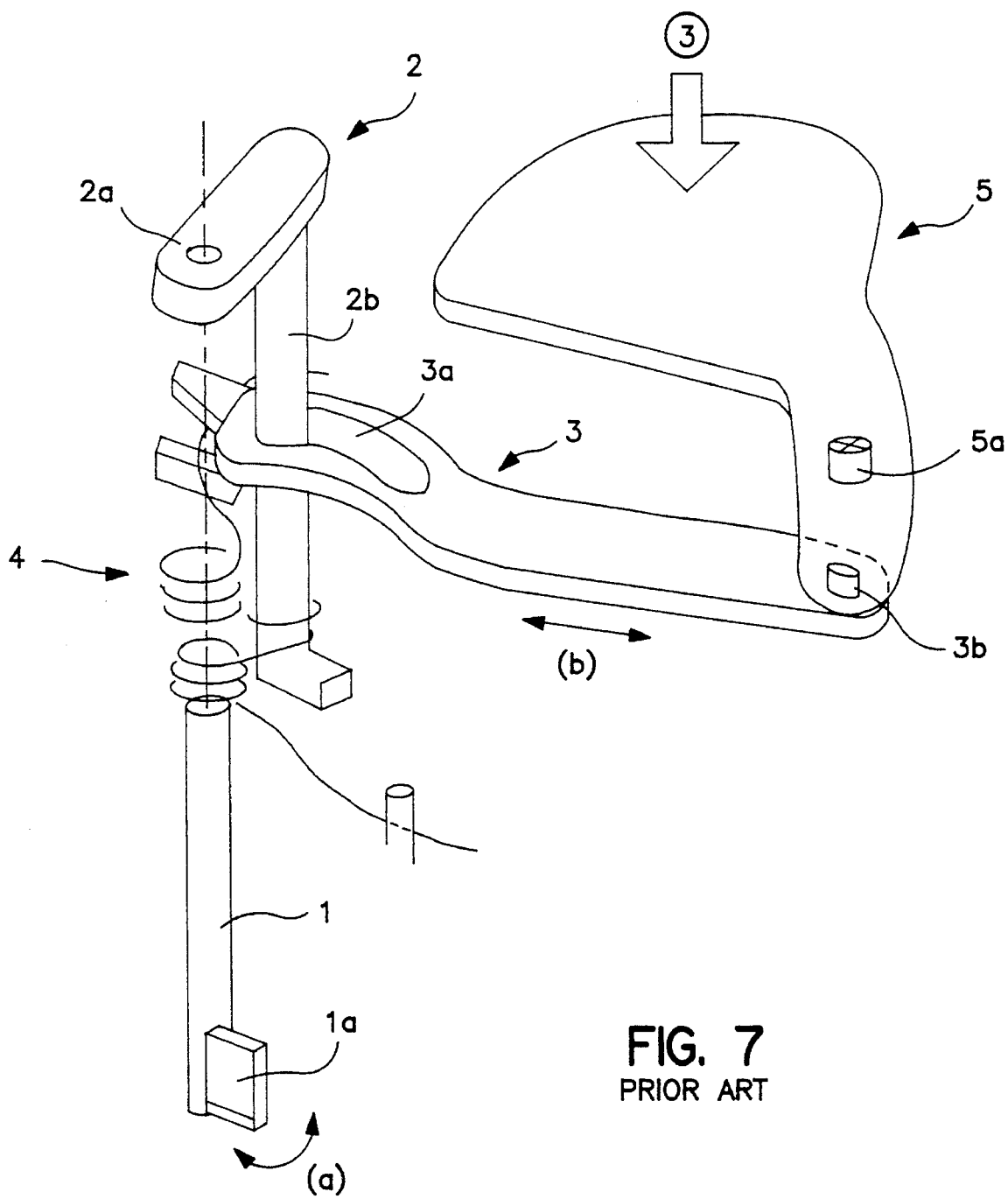
FIG. 7 is a view illustrating a conventional lens cover drive mechanism which drives a lens cover of a camera.

FIGS. 1 through 6 show a camera according to an embodiment of the present invention. FIG. 1 is a schematic oblique diagram showing the essential features of a drive unit of a lens barrel and a lens cover in a camera according to an embodiment of the present invention. FIG. 2 is a side surface view of the lens cover drive mechanism and FIG. 3 is a schematic diagram of the lens cover drive mechanism shown in FIG. 1 as viewed from the camera front side surface. FIG. 4 is an exploded assembly view of the elements which cause operation of the lens cover. FIGS. 5A through 5C are close-up views of assembled parts in FIG. 4, and FIG. 6 is a cross sectional view of the assembled state of the elements shown in FIG. 4.

FIGS. 1 through 3 show a drive system and drive source of a lens barrel 29, how drive power transfer action is effected from the front surface of a camera body 31, and a lens cover opening and closing at the front surface of a photographic lens L maintained in the lens barrel 29.

In FIG. 1, the camera includes an electric motor 21, a gear 22 pressed onto a shaft of the motor 21, and a sun gear (also known as a central gear) 23 driven to and from gear 22 via a gear train not shown in the drawing. A planetary gear train includes the sun gear 23, a planetary gear 26 and a planetary gear arm 24 which connects the axes of rotation of each of the sun gear 23 and the planetary gear 26, and functions as described below.

The planetary gear train regulates the positional relationship of both the sun gear 23 and the planetary gear 26 in engagement with each other, such that the sun gear 23 and the planetary gear 26 are integrally coupled by the planetary gear arm 24.

In the planetary gear train, when rotation is imparted to the sun gear 23, the planetary gear arm 24 connected to the axis of rotation of the sun gear 23 rotates to cause the planetary gear 26 to revolve about the sun gear 23. The teeth of these gears are always enmeshed, resulting in both of the gears rotating simultaneously in opposite directions with respect to each other.

A shaft 25 is used as a stop element formed in the planetary gear arm 24 to prevent oscillation of the planetary gear 26, that is, the oscillation end side. A stop lever 27 has a position which limits the oscillation of the planetary gear 26 about the sun gear 23 by being supported on a shaft of a member of the camera body and has a partial stop portion cooperating with the shaft 25. A tension spring 43 provides an urging force on the planetary gear arm 24 to urge the shaft 25 in the direction of the stop lever 27, shown in FIGS. 1 and 3. As a result, the shaft 25 engages the stop lever 27, thereby stopping the revolution of the shaft towards a large gear 28.

The large gear 28 is fitted by a helicoidal connection on the outer circumference of the lens barrel 29 (shown in FIG. 2). The large gear 28 is driven in rotation when the planetary gear 26 revolves about the sun gear 23 and is in an oscillating gear engagement with the large gear 28. Through the rotation of the large gear 28, the lens barrel 29 is extended or contracted and moved in the optical axis direction of the camera.

Here, the lens barrel 29 supports a photographic lens L fitted internally in the lens barrel 29. Rotary action of the lens barrel 29 is limited by a rectilinear gear not shown in the drawings. The rectilinear gear motion accompanying the rotation of the large gear 28 provides for the performance simultaneously of extending and rectilinearly moving the lens barrel 29.

An extension 28b is formed on an outer circumference 28a of the lens barrel 29 smaller than the outer circumference on which the large gear 28 is formed. When the large gear 28 is rotated, the extension 28b rotates as well. When the extension 28b is rotated clockwise as viewed in FIG. 3, it contacts an angled edge of the stop lever 27, causing a counterclockwise rotation of the stop lever 27. As a result, the stop lever 27 disengages from the shaft 25, thereby allowing for rotation of the planetary gear arm 24, and thus, revolution of the planetary gear 26 in a clockwise direction about the sun gear 23.

A lens cover 30, which selectively opens and closes the aperture in a front surface plate 31 of the camera body, is rotatably supported on a shaft 38, as mentioned below. The lens cover 30 is operated to cover the front surface of the lens barrel 29 when the lens barrel 29 is in a collapsed state and opens to allow the lens barrel 29 to extend from the camera body.

The portion of the lens cover 30 which occludes the aperture of the front surface plate 31 is formed to have an approximately flat plate shape.

In FIG. 1, a gear 33 is situated on a side of the large gear 28 to which rotary motive power is transmitted by the planetary gear 26. The gear 35 rotates in engagement with the idler gear 34 and, in addition, has a pin 35a formed on the back surface. The pin 35a extends towards the back surface of the camera body (towards the upper right in FIG. 1).

Furthermore, an oscillating lever 36 is actuated to oscillate by the pin 35a formed on the gear 35 back surface. An oscillation end side of the oscillating lever 36 is formed as a gear portion (see FIG. 3) which is in engagement with a gear 37. The gear 37 is supported on a slide above the shaft 38, and forms a rotary drive. The lift amount of the oscillating lever 36 is designed to slightly overshoot beyond the stop position of a barrier (not shown in the drawings). The sun gear 23, planetary gear arm 24, planetary gear 26, gear 33, idler gear 34, gear 35 oscillating lever 36 and gear 37 form a transmission member which transmits the drive force of the electric motor 21 to the lens cover 30.

In FIG. 3, a slit gear 40, which has predetermined slits, is moved via a gear train, not shown in the drawing, from the gear 22 on the motor shaft. A photointerrupter 41 recognizes the passage of the slits of the slit gear 40, and the number of slits is counted by a CPU, not shown in the drawing. These elements perform a function as a sensor for feedback control of the extension amount of the lens barrel 29.

With reference to FIG. 4, a connection of the lens cover 30 and gear 37 of the camera according to the embodiment of the present invention will be described.

The gear 37 is pushed onto the shaft 38 which has been pressed beforehand into an enclosure 50. An intermediate lever 53 is riveted on the gear 37. A drive spring 54 is pushed onto the shaft 38 and, as shown in FIG. 5A, one end of the drive spring 54 is caused to cooperate with the intermediate lever 53, and the other end is caused to cooperate with a convex portion located in the enclosure 50. The drive spring 54 is a twisting spring. A washer 55 is pushed onto the shaft 38 and a stressed spring 56 is pressed onto the shaft 38, as shown in FIG. 5B. One end of the stressed spring 56 is caused to cooperate with the intermediate lever 53 and, as shown in FIG. 5C, the other end is caused to cooperate with the lens cover 30. Moreover, the stressed spring 56 is a twisting spring. Lastly, the lens cover 30 is pushed onto the shaft 38, and is fastened with a screw 57. Without the washer 55 acting as a spacer, the drive spring 54 and the stress spring 56 may become entangled. Therefore, by providing the washer between the drive spring 54 and the stressed spring 56, entanglement of the drive spring 54 and the stressed spring 56 is prevented.

FIG. 6 is a cross sectional view of the assembled parts shown in FIG. 4.

The operation of the lens cover drive mechanism according to the embodiment of the present invention will be described below.

The drive force generated in the electric motor 21 is transmitted to the gear 37 through the gears 33 through 35 and oscillating lever 36. The intermediate lever 53, secured to the gear 37, rotates due to the drive force of the electric motor 21 and the resilient force of the drive spring 54. The intermediate lever 53 and the drive spring 54 act as an urging member, wherein the rotation of the intermediate lever 53 is transmitted via the stressed spring 56, acting as a buffer member, to the lens cover 30, and the opening and closing of the lens cover 30 is performed.

An operation of the lens cover drive mechanism will be described in the case that the lens cover 30 is compelled not to open by an external force.

The drive force generated by the electric motor 21 is transmitted to the drive gear 37. Using the resilient force of the drive spring 54, the drive force of the electric motor 21 rotates the intermediate lever 53 secured to the gear 37. One end of the stressed spring 56 cooperates with the intermediate lever 53. The rotary force of the intermediate lever 53 is applied to this one end. By means of the rotary force of the intermediate lever 53, the one end of the stressed spring 56 is rotated in the rotation direction of the intermediate lever 53. The other end of the stressed spring 56 cooperates with the lens cover 30.

If an external force is applied to the lens cover 30 at this other end to prevent movement of the lens cover 30, the external force applied to the lens cover 30 affects the position of this other end. As a result, the one end which cooperates with the intermediate lever 53 rotates together with the intermediate lever 53, and the other end, which cooperates with the lens cover 30, enters a stopped state. Namely, the stressed spring 56 deforms resiliently, and becomes in a twisted state with the shaft 38 as a center. At this time, the lens cover 30 is not subjected at all to any load. Namely, damage to the members related to the lens cover 30 is prevented.

By means of the lens cover drive mechanism according to the embodiment, the risk of deformation or breakage of the lens cover or transmission members is mitigated because the drive force from the electric motor is absorbed.

Further, by having the urging member (intermediate lever 53 and drive spring 54), the buffer member (stressed spring 56) and the axis of rotation of the lens cover centered on a single shaft, the camera body is able to be more compact, thus making the entire camera smaller.

Although a preferred embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A lens cover mechanism which drives a lens cover to cover a surface of a lens, said lens cover drive mechanism comprising:

a drive source to generate a drive force;

a transmission member to receive the drive force from the drive source;

an urging member to receive the drive force from said transmission member;

a buffer member to receive the drive force from said urging member and, in response, rotating the lens cover to one of cover and uncover the surface of the lens if there is no external force of a given amount preventing movement of the lens cover and preventing the drive force from being transmitted from said urging member to the lens cover if the external force prevents movement of the lens cover; and a shaft, on which an axis of rotation of the lens cover, said urging member and said buffer member are arranged.

2. The lens cover drive mechanism as claimed in claim 1, wherein said buffer member has a first end which receives the drive force from said urging member and a second end which receives the external force, said buffer member being a spring which twists in response to the drive force and the external force.

3. The lens cover drive mechanism as claimed in claim 1, wherein said buffer member has a first end which receives the drive force from said urging member and a second end connected to the lens cover and which receives the external force, said buffer member being a spring which rotates to transmit the drive force from said urging member to the lens cover if the external force does not exist, and which twists to absorb the drive force and prevent transmission of the drive force from said urging member to the lens cover if the external force exists.

4. The lens cover drive mechanism as claimed in claim 1, wherein said buffer member is a resilient member.

5. The lens cover drive mechanism as claimed in claim 2, wherein said buffer member is a resilient member.

6. The lens cover drive mechanism as claimed in claim 3, wherein said buffer member is a resilient member.

7. The lens cover drive mechanism as claimed in claim 1, wherein said drive source is an electric motor.

8. The lens cover drive mechanism as claimed in claim 1, wherein said transmission member comprises a plurality of gears.

9. The lens cover drive mechanism as claimed in claim 1, wherein:

said buffer member comprises a first coil spring having a first end connected to the lens cover and a second end;

said urging member comprises
a second coil spring having a first end connected to said transmission member and a second end, and
an intermediate lever connected to the second ends of said first and second coil springs, wherein said coil spring is between said first coil spring and said intermediate lever; and the lens cover drive mechanism further comprises a spacer arranged between said first and second coil springs to prevent direct contact between said first and second coil springs.

10. The lens cover drive mechanism as claimed in claim 1, wherein said at least one transmission member comprises:

a first gear;

a planetary gear train having a sun gear for alternately engaging and disengaging the drive source and a planetary gear which engages said sun gear and revolves about said sun gear to alternately engage said first gear and a second gear formed on a circumference of a lens barrel which holds the lens; and a plurality of gears engaging one another, wherein one of said plurality of gears engages said first gear and another one of said plurality of gears is connected to said urging.

11. A lens cover drive mechanism which drives a lens cover to cover a surface of a lens, said lens cover drive mechanism comprising:

a drive source to generate a drive force;

a transmission member to receive the drive force;

an urging member to receive the drive force from said transmission member;

a buffer member to receive the drive force from said urging member and, in response, rotating the lens cover to one of cover and uncover the surface of the lens if there is no external force of a given amount preventing movement of the lens cover and preventing the drive force from being transmitted from said urging member to the lens cover if the external force prevents movement of the lens cover; and a spacer arranged between said urging member and said buffer member to prevent direct contact between portions of said urging member and said buffer member.

12. The lens cover drive mechanism as claimed in claim 11, wherein said buffer member has a first end which receives the drive force from said urging member and a second end which receives the external force, said buffer member being a spring which twists in response to the drive force and the external force.

13. The lens cover drive mechanism as claimed in claim 11, said buffer member has a first end which receives the drive force from said urging member and a second end connected to the lens cover and which receives the external force, said buffer member being a spring which rotates to transmit the drive force from said urging member to the lens cover if the external force does not exist, and which twists to absorb the drive force and prevent transmission of the drive force from said urging member to the lens cover if the external force exists.

14. The lens cover drive mechanism as claimed in claim 11, wherein said buffer member is a resilient member.

15. The lens cover drive mechanism as claimed in claim 12, wherein said buffer member is a resilient member.

16. The lens cover drive mechanism as claimed in claim 13, wherein said buffer member is a resilient member.

17. The lens cover drive mechanism as claimed in claim 11, wherein said drive source is an electric motor.

18. The lens cover drive mechanism as claimed in claim 11, wherein said transmission member comprises a plurality of gears.

19. The lens cover drive mechanism as claimed in claim 11, wherein said at least one transmission member comprises:

a first gear;

a planetary gear train having a sun gear for alternately engaging and disengaging the drive source and a planetary gear which engages said sun gear and revolves about said sun gear to alternately engage said first gear and a second gear formed on a circumference of a lens barrel which holds the lens; and a plurality of gears engaging one another, wherein one of said plurality of gears engages said first gear and another one of said plurality of gears is connected to said urging member.

* * * * *